Figure 1:
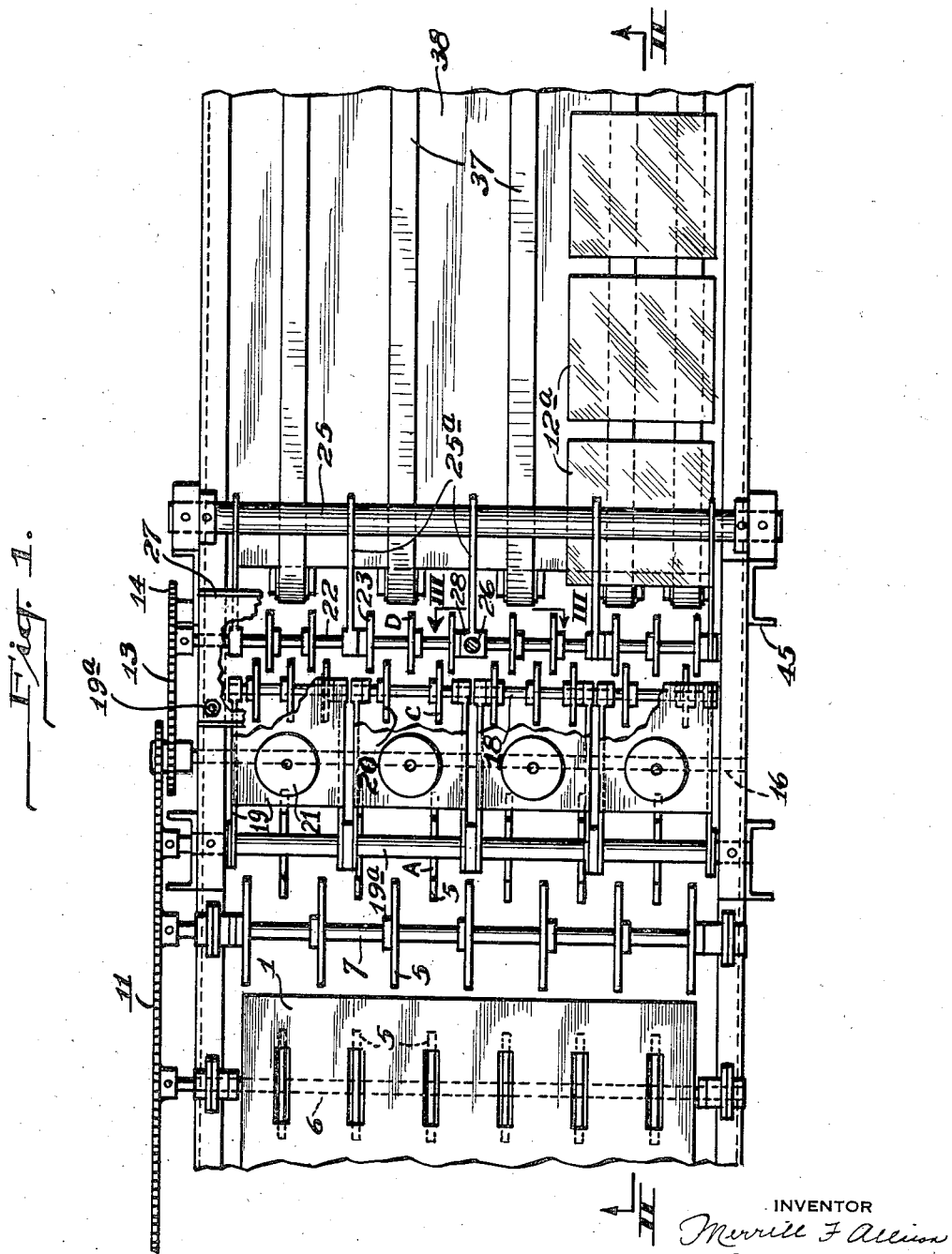

June 2, 1936. M. F. ALLISON 2,042,819
APPARATUS FOR CRACKING SCORED GLASS SHEETS
Filed Oct. 6, 1933 2 Sheets-Sheet 1

INVENTOR
Merrill F Allison
by
Bradley & Bee
attys

June 2, 1936. M. F. ALLISON 2,042,819
APPARATUS FOR CRACKING SCORED GLASS SHEETS
Filed Oct. 6, 1933 2 Sheets-Sheet 2
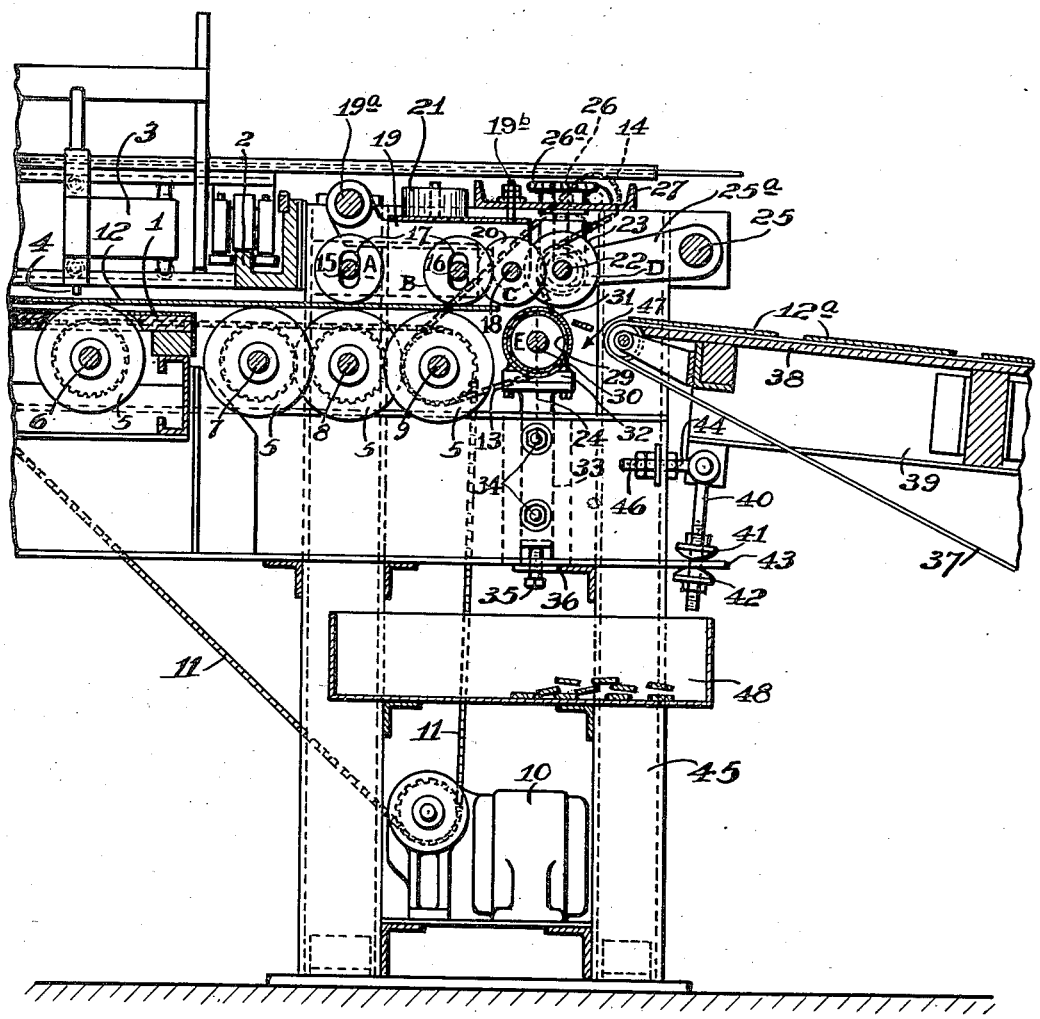
Fig. 2.
Fig. 3.
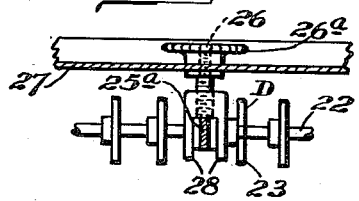
INVENTOR Patented June 2, 1936

2,042,819

UNITED STATES PATENT OFFICE 2,042,819

APPARATUS FOR CRACKING SCORED GLASS SHEETS

Merrill F. Allison, Clarksburg, W. Va., assignor to Pittsburgh Plate Glass Company, a corporation of Pennsylvania Application October 6, 1933, Serial No. 692,497

4 Claims. (Cl. 49—48)

The invention relates to apparatus for cracking off glass sheets which have been previously scored in a straight away cutting operation, such as that disclosed in the application of William Owen, Serial No. 664,926, filed April 7, 1933. The glass after being scored is carried forward over a roller runway and through the cracking off device which applies the pressure necessary to crack the sheets along the lines of scoring, and then forwards the sections onto a suitable conveyor. The invention has for its principal objects the provision of an improved apparatus, which will crack the glass with certainty and without any appreciable loss through breakage; which will operate to crack off successively very narrow strips, such as is ordinarily required at the front and rear ends of a scored sheet; and which will separate the edges of the sections as soon as the cracking off occurs, and thus avoid chipping at such edges. One embodiment of the invention is illustrated in the accompanying drawings, wherein:

Figure 1 is a plan view with certain of the parts removed to more clearly disclose the structure therebeneath. Fig. 2 is a section on the line II—II of Fig. 1. And Fig. 3 is a section on the line III—III of Fig. 1.

The sheets to be cracked off are supplied from the cutting table 1 over which is mounted a track 2 carrying the cutter bridge 3 upon which are mounted suitable cutter heads provided with cutters 4. This provides a means for scoring the glass sheets transversely of the line of travel of the runway, which runway includes discs 5 mounted on the shafts 6, 7, 8 and 9. These rollers are driven from the motor 10 by means of a chain 11 passing over suitable sprockets on the ends of the shafts.

Mounted above the line of movement of the glass sheet 12 which has been scored and is now to be cracked off are a series of rollers A, B, C and D, the rollers A and B being holding down rollers and the rollers C and D being the top cracking off rollers. Lying intermediate the rollers C and D below the line of travel of the glass is a bottom cracking off roller E. The rollers A, B and C are idlers, while the rollers D and E are driven from a chain 13 which passes around sprockets on the shafts of these rollers and also around a sprocket on the shaft 9 and an idler sprocket 14.

The holding down rollers A and B are preferably made in sections and mounted on shafts 15 and 16. These shafts ride in suitable slots 17 in their journals so that the rollers are free to move up and down. These rollers are relatively heavy and hold the glass sheet down in firm engagement with the rollers therebeneath. The roller C is made in sections mounted on the shafts 18, 18, etc., as indicated in Fig. 1, and these shafts are journalled in pairs of arms 19, 19, etc., all pivoted upon the rod 19a. These rollers are preferably made up of the discs 20, 20, 20, etc. and are held down by means of the weights 21, 21, etc. carried upon the arms 19. The downward movement of the arms 19 is limited by stop bolts 19b carried by the channel 27 and extending through perforations in the arms. The roller D comprises a transverse shaft 22 carrying the discs 23 and this shaft is carried by the arms 25a, 25a, etc. pivoted upon the shaft 25. As indicated in Fig. 1, the discs 23 of the roller D are interspersed with the discs 20 of the roller C, so that the shafts 18 and 22 may be brought relatively close together on opposite sides of the center line 24, which extends vertically through the axis of rotation of the roller E. The roller D is forced down to give the necessary cracking off pressure upon the glass by means of the screw 26, shown in Fig. 3, such screw having a knob 26a at its upper end which is swivelled in the channel 27. The lower portion of the screw is threaded into a two-part nut 28 carried at the end of the middle arm 24.

The roller E is in the form of a cylinder 29 mounted upon a shaft 30 and having a covering 31 of canvas or medium hard rubber. The shaft 30 is journalled in suitable bearings 32 carried by vertically adjustable bars 33 clamped to the framework of the machine by means of the screws 34. When these screws 34 are loosened, the bars 33 may be adjusted vertically by means of nuts 35 threaded through the brackets 36 carried by the frame. In this manner, the roll may be adjusted to the proper height to cooperate with the rollers C and D in the cracking off operation.

As the glass sheet 12 which has been previously scored, passes over the roller E and beneath the rollers C and D, the pressure of these rollers causes the sheet to crack along the line of scoring, and the sections 12a which are thus cracked off, are delivered onto a conveyor in advance of the rollers D and E. This conveyor comprises driven belts 37, whose upper flights move over a wooden deck 38. This deck is carried by a frame 39 and is adjustable up and down by means of the threaded rods 40 provided with the nuts 41 and 42 lying on opposite sides of the bracket plate 43. An adjustment of the conveyor toward and from the framework of the cracking off apparatus is provided for in the form of the rods 44 extending through the flange of the channel 45 and provided with the nuts 46. A space is preferably provided between the end of the conveyor and the roller E, as indicated at 47, in order to permit narrow strips of glass, which are cut from the front and rear ends of the glass sheet and constitute wastage, to fall down into the cullet box 48.

In operation, the roller D is driven at a somewhat higher peripheral speed than the roller E due to the fact that the drive sprocket of the roller D around which the chain 13 passes is somewhat smaller than the sprocket of the roller E and as a result, the roller D moves the section of glass which is snapped off forward slightly as soon as the cracking off occurs. This separation of the edges of the sheet sections is advantageous, as it prevents such edges from rubbing together and chipping on the further forward movement of the glass. The sectional formation of the roller C tends to prevent breakage when a sheet of a width substantially less than the width of the runway is being cracked off, as under these conditions, only the weight of a part of the roll sections is applied to the glass. The use of the roller C not only improves the cracking action of the roller D, due to its steadying and holding down function, but also serves the further purpose of cracking off the short section at the tail end of the sheet which section drops down through the space to the left of the roll E into the box 48.

What I claim is:

1. In combination in an apparatus for cracking off glass sheets which have been scored, a runway for forwarding the glass sheets, a bottom cracking off roller, over which the glass sheets are delivered, a pair of top cracking off rollers along the line of movement of the glass sheets adapted to engage the upper surfaces of the sheets and apply pressure thereto and having their axes of rotation on opposite sides of the vertical plane in which the axis of rotation of the bottom cracking off roller lies, and means for driving the bottom cracking off roller and the forward member of the pair of top cracking off rollers, the other member of such pair being made up of a plurality of sections free to move up and down independently of each other.

2. In combination in an apparatus for cracking off glass sheets which have been scored, a runway for forwarding the glass sheets, a bottom cracking off roller fixed against vertical movement over which the glass sheets are delivered, and a pair of cracking off rollers above the line of movement of the glass sheets adapted to engage the upper surfaces of the sheets and apply pressure thereto and having their axes of rotation on opposite sides of the vertical plane in which the axis of rotation of the bottom cracking off roller lies, the forward one of said pair of rollers being fixed against vertical movement while the other one is free to move vertically.

3. In combination in an apparatus for cracking off glass sheets which have been scored, a runway for forwarding the glass sheets, a bottom cracking off roller fixed against vertical movement over which the glass sheets are delivered, and a pair of cracking off rollers above the line of movement of the glass sheets adapted to engage the upper surfaces of the sheets and apply pressure thereto and having their axes of rotation on opposite sides of the vertical plane in which the axis of rotation of the bottom cracking off roller lies, said top cracking off rollers being each made up of a plurality of spaced discs with the discs of one roller interspersed with the discs of the other roller, and the forward one of said pair of rollers being fixed against vertical movement while the other one is free to move vertically.

4. In combination in an apparatus for cracking off glass sheets which have been scored, a runway for forwarding the glass sheets, a bottom cracking off roller fixed against vertical movement over which the glass sheets are delivered, means for driving said roller, and a pair of cracking off rollers above the line of movement of the glass sheets adapted to engage the upper surfaces of the sheets and apply pressure thereto and having their axes of rotation on opposite sides of the vertical plane in which the axis of rotation of the bottom cracking off roller lies, the forward one of said pair of rollers being fixed and driven at a higher peripheral speed than that of the bottom cracking off roller while the other one of said pair of rollers is free to move vertically.

MERRILL F. ALLISON.